March 10, 1942.   R. G. AREY   2,275,880
MAGNETIC STRUCTURE
Filed Oct. 5, 1939
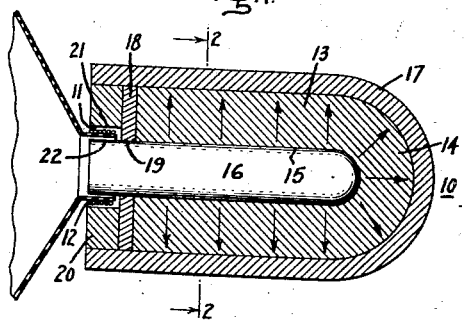
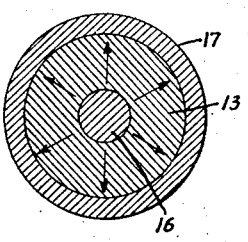
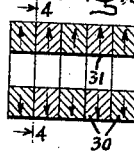
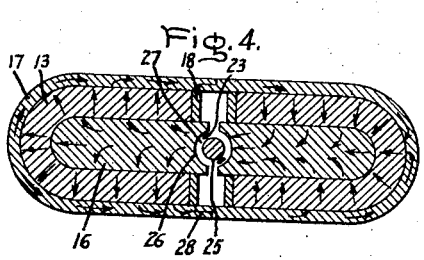
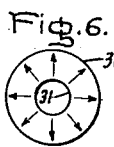
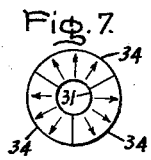
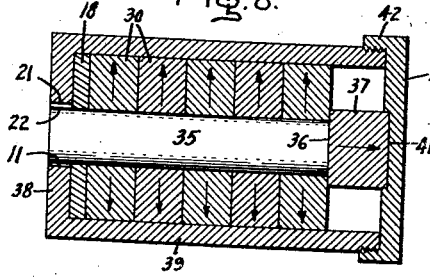
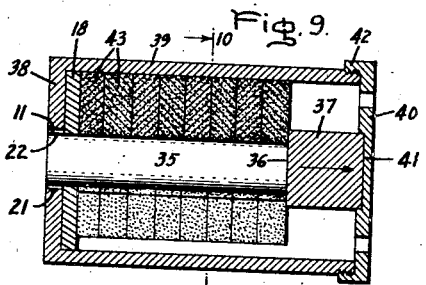
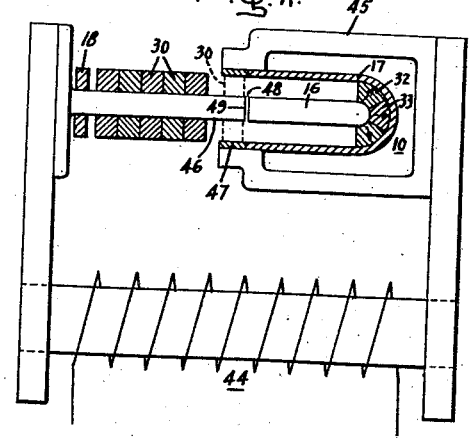
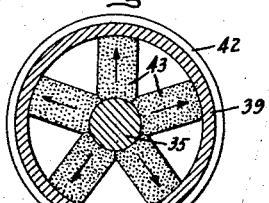
Inventor:
Ralph G. Arey,
by Harry E. Dunham
His Attorney.

Patented Mar. 10, 1942

2,275,880

UNITED STATES PATENT OFFICE 2,275,880

MAGNETIC STRUCTURE

Ralph G. Arey, Swampscott, Mass., assignor to General Electric Company, a corporation of New York Application October 5, 1939, Serial No. 298,154

5 Claims. (Cl. 175—21)

This invention relates to permanent magnets and concerns particularly permanent magnets arranged in a magnetic circuit to provide magnetic flux in an air gap, such for example, as that employed in sound translating devices of the dynamic type, and electrical measuring instruments of the D'Arsonval type.

An object of my invention is to provide an improved permanent magnet structure in which the leakage flux is reduced to a minimum so that the available magnetic energy of the material may be utilized to its greatest efficiency.

Another object of my invention is to provide an improved magnetic circuit including a permanent magnet of novel construction for producing an intense magnetic field in an air gap.

A further object of my invention is to provide a magnetic structure of the above character which shall be of simple construction and which may be manufactured and assembled in an economical manner.

Other objects and advantages of my invention will become apparent as the description proceeds.

In accordance with my invention in its preferred form, in order to obtain a very strong magnetic flux with a minimum weight and bulk of magnetic material, I employ a permanent magnet of high coercive force material and utilize a construction for the magnetic circuit whereby the leakage area is reduced to a minimum. I provide a radially magnetized hollow cylindrical permanent magnet having a sphere-shaped closed end portion with its inner surface joined by a central core member of soft iron or other relatively permeable magnetic material. The outer cylindrical and spherical surfaces of the magnet are joined by a magnetic shell or yoke which serves as a part of the magnetic return circuit. In one embodiment I provide an annular ring of relatively permeable magnetic material with its outer annular surface joined to the inner surface of the shell adjacent the open end of the latter, and with its inner circular surface serving as a pole face. A working air gap is formed between the central core and the annular pole face within which is established an intense magnetic field.

As a modification I may form the magnet from a plurality of rings with the sphere-shaped end portion formed by several individual segments or as a single piece. Or, if desired, the sphere-shaped end portion may be dispensed with and a bar-shaped permanent magnet employed to join the end of the central core to the outer shell. In this latter construction the annular ring which serves as the pole face may be formed integrally with the outer shell, in which case the opposite end of the shell may be closed by a permeable cap or closure member.

As still another modification, I may employ a plurality of bar-shaped permanent magnets positioned with their like poles of one polarity in engagement with the central core and their like poles of the opposite polarity in engagement with the inner surface of the shell.

The novel features which are characteristic of my invention are pointed out in the appended claims. My invention, however, will be understood more readily by reference to the following detailed description when considered in connection with the accompanying drawing in which Fig. 1 is a cross-sectional view of a magnetic circuit including a permanent magnet constructed in accordance with my invention; Fig. 2 is a sectional view taken along the line 2—2 of Fig. 1; Figs. 3 and 4 are modifications of Fig. 1 showing my invention applied to an electrical measuring instrument; Figs. 5 to 10 inclusive, are corresponding views of various modified forms of magnetic circuits utilizing the principles of my invention; and Fig. 11 represents apparatus which may be employed for magnetizing the permanent magnet.

Referring to Figs. 1 and 2 of the drawing, for the purpose of illustrating my invention, I have shown a permanent magnet field structure 10 providing an annular air gap 11 which is adapted to receive a vibratory coil 12 such as the voice coil of a loudspeaker. In Figs. 1 and 2 the numeral 13 represents a hollow permanent magnet in the form of a cylinder with a closed sphere-shaped end portion 14. Within the central opening 15 of the magnet is tightly pressed a central core member 16. A yoke or shell 17 having its inner surface made to conform to and engage the external surface of the magnet 13, provides a low reluctance return path for the magnetic flux set up by the magnet and in conjunction with the core 16 serves to concentrate the flux in the air gap 11. To provide a rigid support for the core 16 relative to the yoke 17, I employ an annular disk 18 of brass or other suitable non-magnetic material having a central opening 19, the surface of which is adapted to fit in pressed engagement with the core 16. The external annular surface of the disk engages the internal surface of the shell 17.

I provide a circular end plate 20 having its external cylindrical surface in firm engagement with the internal surface of the yoke or shell 17, The end plate 20 is provided with a concentric opening 21 which cooperates with the outer surface 22 of the core to define the annular air gap 11 in which it is desired to concentrate the magnetic flux produced by the magnet 13.

The member constituting the permanent magnet 13 is composed of permanent magnet material, preferably material having a relatively high coercive force, as compared, for example, to the old or usual form of chrome steel, in order that a high degree of magnetization may be maintained and a compact construction may be used with the field producing member 13 magnetized in the direction of its short dimension. While my invention is not limited to the use of any particular materials, I have found that highly satisfactory results may be obtained by the employment of permanent magnet alloys containing iron, nickel, and aluminum as the basic or essential ingredients, as described in U. S. Patents 1,947,274 and 1,968,569, to William E. Ruder, and 2,027,994 to 2,028,000, inclusive, to Tokushichi Mishima. Or if a sintered magnet formed from such alloys is employed, it may be formed in accordance with the sintering process disclosed in a copending application, Serial No. 196,691, filed March 18, 1938, Patent No. 2,192,743, to Goodwin H. Howe, entitled "Sintered permanent magnet," and assigned to the same assignee as the present invention. The coercive force of these alloys is approximately 440 oersteds and they have a residual induction of about 7500 gausses.

Another material which is highly satisfactory for providing a permanent magnet of unusually short length in its polarized axis is prepared and magnetized as follows:

Mix together finely powdered magnetite, ferric oxide, and cobaltic oxide in the proportion of 43.6 per cent of magnetite, 30.1 per cent of ferric oxide, and 26.3 per cent of cobaltic oxide. Mold the mixture in the shape desired under pressure of from three to five tons per square inch. Remove from the mold and heat in an atmosphere of nitrogen or air for two to three hours at about 1020° C. and allow to cool. Then reheat to about 520° C. in a special furnace placed in the air gap of a direct-current electro-magnet with a field of about 3000 h. With the field on, lower the temperature to about 300 or 320° C. and hold in the field within this range of temperature for about three quarters of an hour. Then allow to cool in the field to below 100° C. The material may then be machined or ground to shape if necessary.

The permanent magnet strength of this material is several times that of ordinary permanent magnets, such for example as those made from chrome steel, for the same size and shape of magnet and the material is only about half the weight of such steel. This material prepared as previously described has a coercive force between 700 and 1000 oersteds and it has a residual induction of about 2,200 gausses. Due to this high coercive force, the sintered oxide permanent magnet can be made very short in its polarized axis and is thus particularly suitable where economy in space is an important item.

The magnet 13 is magnetized radially in order to send a flux through the working air gap 11 via the core 16, the yoke 17, and the annular pole piece 20. This arrangement provides a magnet of relatively short length in its polarized axis and of large cross-section. The direction of magnetization is represented by the arrows.

The central core or pole piece 16, the annular pole piece 20, and the yoke 17 are preferably composed of soft iron or other relatively high permeability, low coercive force, magnetic material.

Inasmuch as the central core member 16 must carry all of the magnetizing flux it tends to become saturated at a value below that necessary to magnetize the entire area of the magnetic material 13 at one time so that it is difficult to magnetize the material to the saturation point. However, for short axial lengths, the core 16 does not saturate and the magnet 13 may be magnetized by simply removing the circular pole piece 20 and applying a suitable magnetizing force across the core 16 and the yoke or shell 17.

Figs. 3 and 4 represent respectively perspective and cross-sectional views of an electrical measuring instrument of the D'Arsonval type embodying the principles of my invention. The instrument comprises an instrument mechanism consisting of a movable element or current conducting coil 23 mounted with a pair of magnetic field elements similar to 10 of Fig. 1 and provided with a pointer 24. The magnetic field comprises a cylindrical core 25 mounted substantially coaxial with the axis of rotation of the element 23, a pair of central pole pieces or flux carrying elements 16 positioned in axial alignment with their pole faces 26 located in spaced opposed relation to form air gaps 27 for the movable element. A permanent magnet 13 is positioned about each of the cores as explained in connection with Fig. 1 and a pair of magnetic elements 17, each of which has its internal surface in contact with the external surface of one of the magnets, provides a magnetic flux return path.

As indicated clearly in the drawing the relatively permeable members 17 which form the flux return path are joined together in any convenient manner at 28.

The operation of the device should be clear from the description of Figs. 1 and 2. It will be understood that the magnets are polarized in a direction normal to their internal and external surfaces and, of course, they will be polarized to produce magnetic flux in the same relative direction as indicated by the arrows.

In the embodiment illustrated in Figs. 5 and 6, I have provided a modified arrangement of the permanent magnet 13 which incorporates the desirable features of my invention and which at the same time provides a magnet structure which may be more readily magnetized. In this case the permanent magnet 13 is composed of a plurality of plane-faced concentric rings 30 in axial alignment, the rings being positioned with their plane surfaces side by side and each ring having a central opening 31 for accommodating the central core 16. The closed end of the magnet may be given a sphere-shape by means of an annular segment 32 and an end segment 33. The rings are radially magnetized as indicated by the arrows.

Fig. 7 illustrates a further modification wherein the rings 30 forming the magnet 13 of Fig. 5 are not continuous as shown in Fig. 6 but are formed by a plurality of curved segments 34.

Either of the arrangements illustrated in Figs. 6 and 7 may be employed in composing the magnet 13 of Fig. 5 for use with the magnetic structures of Figs. 1 and 3. While I have shown the sphere-shaped end portion of the magnet 13 in Fig. 5 formed by the segments 32 and 33, my invention is not limited to such a construction but obviously includes an arrangement in which the end portion is composed of a single spherical segment.

In Fig. 8 I have shown another modification embodying a different construction of the end portion of the magnet which necessitates a change in the outer yoke or shell from that shown in Fig. 1. In accordance with the arrangement illustrated, I employ in this case a central pole piece or core member 35 having a plane-faced inner end portion 36 against which abuts a cylindrical bar-shaped permanent magnet 37, magnetized in the direction of its axis as indicated by the arrow. With this construction I find it advantageous to make the end pole piece 38 integral with the cylindrical magnetic yoke or shell 39. The non-magnetic disk 18 performs the same function as that described in connection with Fig. 1, namely, to hold the core 35 and the yoke 39 in fixed relative relation and thereby maintain a precisely dimensioned annular air gap 11 between the outer surface 22 of the core and the inner surface of the central opening or annular pole face 21. To complete the assembly, I employ a cap or closure member 40 of relatively permeable material provided with an annular recess 41 for accommodating the end of the magnet element 37 and having an internally threaded annular flange 42. The threads on the internal side of the flange 42 engage the threads on the yoke or flux return element 39 to hold the parts firmly together.

The method of assembly of the magnetic circuit of Fig. 8 should be obvious. The central pole piece 35 is positioned in the central opening of the pole piece 38 with the annular disk 18 arranged to hold the parts firmly in place as shown. The rings are placed on the core or pole piece 35 in succession, the magnet element 37 is positioned against the end of the core with one of its polar surfaces in engagement with the end surface 36 and the return flux path is completed by the closure member 40.

In Figs. 9 and 10 I have illustrated still another modification which embodies several of the features of the arrangement of Fig. 8 but employs a different form of permanent magnet. The permanent magnet is in this instance composed of a plurality of bars 43 magnetized to send a radially directed flux between the central pole piece 35 and the yoke 39, as indicated by the arrows. The bars 43 are radially positioned about the central core member 35 as clearly shown in the sectional view of Fig. 10.

I have shown in Fig. 11 by way of example, convenient apparatus which may be employed for magnetizing the annular rings 30 and the segments 32 and 33 which form the permanent magnet 13 of Fig. 5. The arrangement illustrated comprises an electromagnet 44 having a plurality of pole pieces 45 and 46. The pole piece 45 is provided with an annular pole face 47 which engages the outer magnetic yoke or shell 17 of the magnet structure 10. The other pole piece 46 of the electromagnet is composed of a highly permeable material and is of sufficient size to accommodate the rings 30 and the disk 18 and of sufficient length to leave an air gap 48 between its end portion 49 and the outer end of the central core 16 when in the position shown. The segments 32 and 33 are positioned within the sphere-shaped end portion of the shell or yoke 17 and the core 16 is then inserted in the shell with its internal sphere-shaped end in firm contact with the inner surfaces of the segments. The rings 30 and disk 18 are positioned on the core 46 and the magnetizing operation is ready to start.

Upon energization of the electromagnet the resulting magnetic flux set up in the core 46 crosses the air gap 48, passes through the core 16, the segments 32 and 33 in the direction of the arrows, and the yoke 17 to the pole 45. The segments 32 and 33 are thereby magnetized to saturation. The ring 30 adjacent the air gap 48 is then moved toward the air gap to the position indicated by the dotted lines so that its outer cylindrical surface engages the annular pole face 47 and the ring is thereby radially magnetized. The ring may then be moved across the air gap and positioned on the core adjacent the annular segment 32. The other rings are then magnetized in succession. At the end of the magnetizing process, the non-magnetic disk 18 is placed in position as shown in Fig. 1 and the circular pole piece 20 is then pressed into the shell or yoke 17 as indicated.

In prior devices of this character, where the permanent magnet is arranged in a central portion; e. g., in the same relative position as the core 16, or where it is arranged in the form of a yoke, much of the useful flux produced by the magnet is lost because of leakage. With the arrangement of the present invention, the leakage area is reduced to a minimum since the external surface of the magnet is almost completely engaged by the highly permeable material which completes the magnetic circuit, only the small portion of the external surface of the magnet body which is adjacent to the outwardly extending end of the central pole piece being out of contact with the outer highly permeable element, which portion is large enough to prevent appreciable short-circuiting of the magnet flux. Magnetic circuits employing permanent magnets so arranged have been found to compare very favorably with electromagnets and the principles employed in the present invention as illustrated by the several embodiments have greatly enlarged the field of usefulness of permanent magnet devices for numerous applications, many of which will readily occur to those skilled in the art. For example, other forms of magnet and pole pieces may be employed and by a suitable rearrangement of the pole faces to give the desired contact area a holding magnet may be readily obtained.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a magnetic circuit, a permanent magnet comprising a cylindrical portion having a central axial opening therein and a second portion forming a closure for one end of said opening, each of said portions being polarized in a direction normal to the surface defining said opening, a central core providing a pole piece and positioned in said opening in engagement with the surface defining said opening, and a magnetic flux return element in engagement with the external surfaces of said portions and cooperating with means including said pole piece to provide a working air gap.

2. In a magnetic circuit, a permanent magnet having a cylindrical portion and a sphere-shaped end portion and provided with a central longitudinal cylindrical opening therein, said magnet being polarized in a direction normal to the wall of said opening, a pole piece having a portion positioned in said opening and in engagement with said wall, and a return flux path including a second pole piece and a relatively permeable element engaging the external surface of said magnet, said second pole piece cooperating with said first pole piece to define a working air gap.

3. A magnetic structure comprising a central core, a cylindrical yoke having a sphere-shaped end portion and mounted in spaced relation about said core, a permanent magnet having a shape similar to said yoke positioned in the space between and in contact with said core and said yoke, said magnet being polarized in a direction normal to said core and said yoke, and a magnetic element secured to said yoke and defining a working air gap with said core.

4. In a magnetic circuit, a central pole piece, a permanent magnet positioned about and in contact with said pole piece, said permanent magnet having surfaces of the character formed by the revolution of two substantially U-shaped spaced lines and polarized in a direction normal to said spaced lines, a return flux path comprising a relatively permeable magnetic element in engagement with the outer surface of said magnet, and an annular pole piece in engagement with said magnetic element and including an annular pole face defining an air gap with said central pole piece.

5. In a magnetic structure, a permanent magnet arranged and constructed as a substantially closed hollow member and having a single opening between the interior and exterior of said member, said magnet being magnetized in such a direction that the inner surface of said magnet forms one pole and the outer surface of said magnet forms a second pole, a pole piece engaging substantially all of said inner surface of said magnet and having a portion extending outwardly through said opening, a second pole piece engaging substantially all the outer surface of said magnet except a small portion adjacent said opening which is out of contact with said second pole-piece to an extent sufficient to prevent appreciable short-circuiting of the magnet flux, said second pole piece having a portion closely adjacent to the extending portion of said first pole piece to form a working air gap whereby the flux leakage between the poles is minimized.

RALPH G. AREY.